(12) United States Patent
Santa Cruz et al.

(10) Patent No.: US 6,217,261 B1
(45) Date of Patent: Apr. 17, 2001

(54) AERATION DISCHARGE OUTLET ASSEMBLY FOR BULK MATERIAL CONTAINERS

(76) Inventors: Cathy D. Santa Cruz, 401 Canyon Way, #43, Sparks, NV (US) 89434; Jack R. Malugani, P.O. Box 60845, Boulder City, NV (US) 89006

( * ) Notice: Subject to any disclaimer, the term of this patent is extended or adjusted under 35 U.S.C. 154(b) by 0 days.

(21) Appl. No.: 09/563,599

(22) Filed: May 1, 2000

(51) Int. Cl.[7] .............................. B65G 53/10; B65G 53/24
(52) U.S. Cl. ........................... 406/145; 406/153; 406/134
(58) Field of Search ........................ 406/86, 122, 144, 406/145, 153, 134

(56) References Cited

U.S. PATENT DOCUMENTS

| | | | |
|---|---|---|---|
| 337,388 | 3/1886 | Fernald et al. | 406/153 |
| 1,982,128 | 11/1934 | Vetrano | 103/270 |
| 2,500,271 | 3/1950 | Bozich | 302/25 |
| 3,149,884 | 9/1964 | Jones | 302/53 |

*Primary Examiner*—Christopher P. Ellis
*Assistant Examiner*—Joe Dillon, Jr.

(57) ABSTRACT

An aeration discharge outlet assembly for use with bulk material containers wherein we provide an external cone and an internal cone. With internal cone being completely surrounded by pressurized air within an annular space and includes multiple air inlet passages which draw in the pressurized air and aerate the flowable substance therein before discharge thereof.

1 Claim, 1 Drawing Sheet

AERATION DISCHARGE OUTLET ASSEMBLY FOR BULK MATERIAL CONTAINERS

FIELD OF THE INVENTION

This invention relates to aerated discharge devices that are used in connection with material transfer tanks, or storage tanks, or vessels, such as typically used for transporting, aerating and discharging bulk materials therefrom. But more particularly pertains to a discharge outlet assembly which is formed from an external outer cone which houses an internal cone, and facilitates the flow and discharge of bulk material and the like through a discharge opening in a bulk material container or hopper.

BACKGROUND OF THE INVENTION

In the past many attempts have been made to improve aeration discharge devices such as those used in connection with bulk material containers, as there is a great need for improvement in this area. Unfortunately, most discharge devices of this nature have inherent problems and disadvantages that heretofore have not been resolved in a cost effective or efficient manner.

For example, U.S. Pat. Nos. 3,092,010; 3,343,888; 3,829,022; 3,264,037 and 4,186,262 all teach various devices used for introducing air or sonic waves into the bulk material product within the storage chamber in order to break-up product blockage and facilitate the free flow of bulk material through a discharge opening in the storage chamber. However, each of these references have inherent disadvantages which the present invention addresses, recognizes, and resolves in a unique manner which heretofore has not been incorporated.

For example, within the known prior art there are still difficulties regarding various conditions commonly known in the field as arching, bridging, "rat-holing" and the like, which the present invention addresses and overcomes.

SUMMARY OF THE INVENTION

It is therefore an object of the present invention to provide an aeration discharge outlet assembly for bulk material containers which is economical, is very efficient, and overcomes the inherent disadvantages known within the prior art.

It is another object of the present invention is to provide an aeration discharge outlet assembly for bulk material containers which is of simple construction and eliminates unnecessary parts which are inherent within the existing discharge apparatuses currently available.

Still another object of the present invention is to provide an aeration discharge outlet assembly for bulk material containers which increases overall efficiency and profitability with faster, more complete product unloading than known prior art constructions.

Yet another object of the present invention is to provide an aeration discharge outlet assembly for bulk material containers which provides increased distribution of air flow throughout the discharge outlet.

Also another object of the present invention is to provide an aeration discharge outlet assembly for bulk material containers which eliminates or prevents product contamination while meeting FDA standards over a wide range of bulk material products.

Still a further object of the present invention is to provide an aeration discharge outlet assembly for bulk material containers which is competitively priced with existing prior art units, while being more durable and longer lasting in use.

Another object of the present invention is to provide an aeration discharge outlet assembly for bulk material containers which is interchangeable with other prior art devices in the field, thus allowing customers to readily install the present invention onto their existing equipment, without requiring substantial modification.

Yet another object of the present invention is to provide an aeration discharge outlet assembly for bulk material containers which does not require complicated installation or continuous maintenance.

Also another object of the present invention is to provide an aeration discharge outlet assembly for bulk material containers which is extremely durable in operation and does not require frequent replacement.

Other objects and distinct advantages will be seen when taken into consideration with the following drawings and specification.

DETAILED DESCRIPTION OF THE DRAWINGS

Referring now in detail to the drawings wherein like characters refer to like elements throughout the various views.

Figure 1:
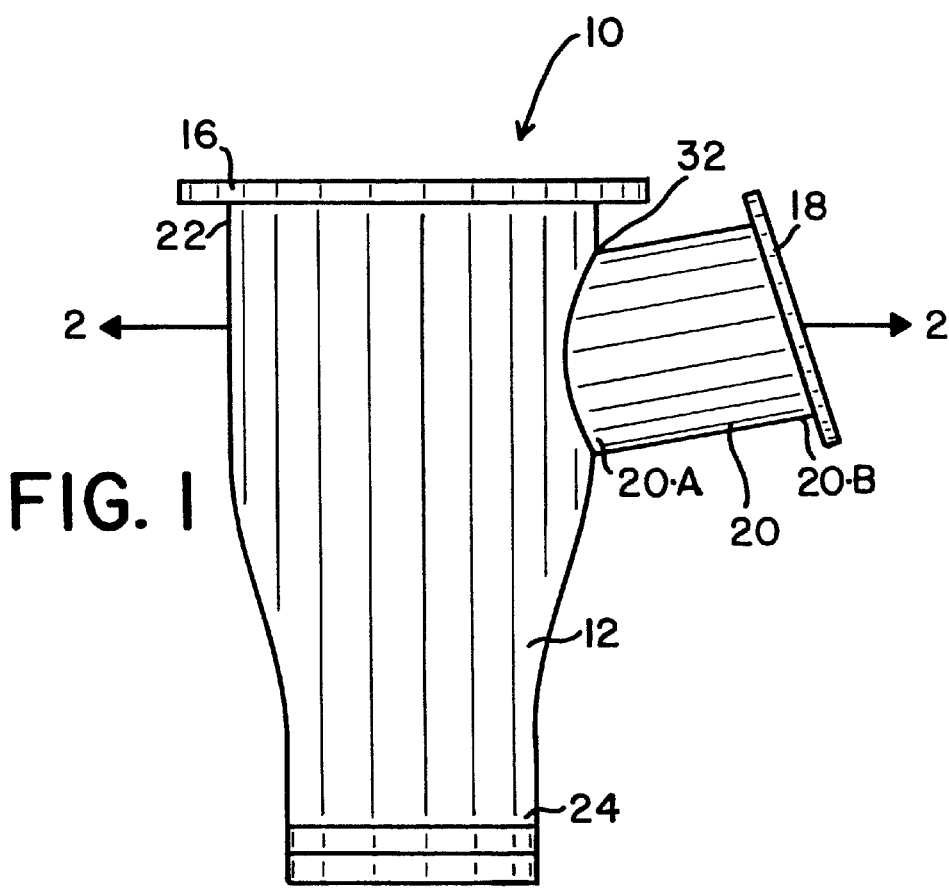
FIG. 1 is substantially a side view of the preferred embodiment for the present invention.
Figure 2:
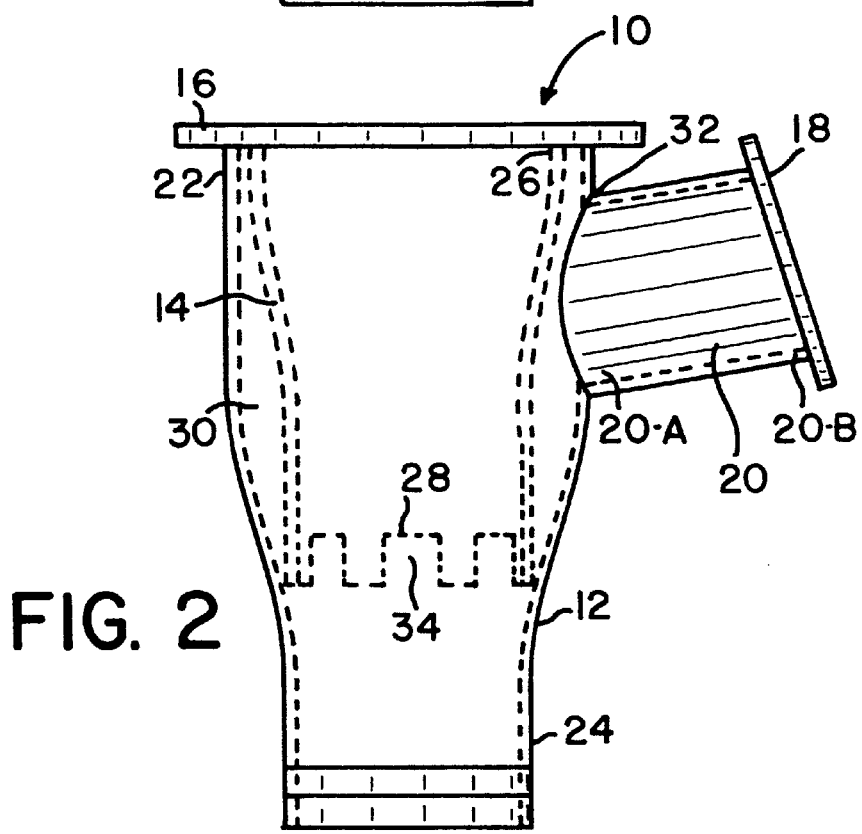
FIG. 2 is substantially a partial sectional view taken at 2—2 of FIG. 1.

In FIGS. 1 & 2, (10) represents a general overview of the present invention which is an aeration discharge outlet assembly for use with bulk material containers. It is to be noted assembly (10) can be made from any suitable material of engineering choice, such as steel, aluminum, etc, and can be of any suitable size, depending on the specific use and/or product which is to be aerated.

Assembly (10) substantially comprises an external cone (12), an internal cone (14), a first flange (16), a second flange (18) and an air inlet port (20), with air inlet port (20) being used for receiving pressurized air there through.

It is to be understood first flange (16) may be attached to substantially any suitable type of a flowable discharge opening of choice, such as those typically used on hopper trucks, hopper cars, storage silos, bins and other types of industrial storage chambers. Therefore, a typical discharge opening is not depicted herein as such discharge openings are well known within the art. Also, any type of suitable attachment means may be used according to engineering choice for attaching first flange (16) to the discharge opening.

It is to be further understood that air inlet port (20) can be affixed to substantially any suitable pressurized air mechanism of choice. Therefore the pressurized air mechanism is not depicted herein, as various types of pressurized air mechanisms are very well known and widely used within the field of the invention and also within the known prior art. Furthermore, any suitable type of attachment means of engineering choice may be used for attaching air inlet port (20) to the pressurized air mechanism, such as second flange (18), or the like.

Referring now to external cone (12), which includes a top end (22) and an open bottom end (24), with open bottom end (24) being used for discharging a flowable substance therefrom. Top end (22) having an inside diameter which is larger than the inside diameter of open bottom end (24). For example, top end (22) may substantially measure 6 inches, while open bottom end (24) may measure 4 inches.

Referring now to internal cone (14) which includes an intake top end (26) for receiving the flowable substance there through and an open discharge bottom end (28) for discharging the flowable substance therefrom into open bottom end (24). Intake top end (26) having an inside diameter which is less than the inside diameter of top end (22). For example, intake top end (26) may substantially measure 5 inches, while inside diameter of top end (22) may substantially measure 6 inches. Furthermore, intake top end (26) having an inside diameter which is larger than the inside diameter of open discharge bottom end (28). For example, intake top end (26) may substantially measure 5 inches while open discharge bottom end (28) may substantially measure 4 inches. Still further, open bottom end (24) having an inside diameter which is substantially equal to the inside diameter of open discharge bottom end (28). For example open bottom end (24) and open discharge bottom end (28) may each measure 4 inches.

It is to be understood top end (22) and intake top end (26) are each fixedly attached to first flange (16) by any suitable attachment means of engineering choice, such as by welding or the like.

It will now be seen external cone (12) and internal cone (14) are separated from each other approximately 1 inch apart. Therefore forming an annular space (30) which extends completely around the outside perimeter of internal cone (14).

External cone (12) having an air inlet opening (32), and air inlet port (20) has a first end (20-A) and a second end (20-B). With the first end (20-A) being fixedly attached onto air inlet opening (32) by any suitable attachment means of engineering choice, such as by welding or the like. While second end (20-B) is fixedly attached onto second flange (18) by any suitable attachment means of engineering choice, such as by welding.

It is to be noted for increased overall performance, open discharge bottom end (28) is notched, thus forming multiple air inlet passages (34).

It can now be seen air inlet port (20), air inlet opening (32) and annular space (30) are in open communication. Whereby, when pressurized air is forced into inlet port (20), the pressurized air is forceably directed into and throughout annular space (30). Thereafter, pressurized air is drawn into air inlet passages (34), thus aerating flowable substance before discharging from within open bottom end (24) in a manner heretofore not taught within the known prior art.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described the invention what we claim as new and wish to secure by LETTERS PATENT is:

1. An aeration discharge outlet assembly for aerating a flowable substrate in use with bulk material containers comprising: an external cone; an internal cone; a first flange; a second flange; and an air inlet port which receives pressurized air there through; said external cone having a top end, said external cone having an open bottom end for discharging the flowable substance therefrom, said top end having an inside diameter which is larger than the inside diameter of said open bottom end, said internal cone having an intake top end which receives said flowable substance there through, said internal cone having an open discharge bottom end for discharging said flowable substance therefrom into said open bottom end, said intake top end having an inside diameter which is less than the inside diameter of said top end, said intake top end having an inside diameter which is larger than the inside diameter of said open discharge bottom end, said open bottom end having an inside diameter which is substantially equal to the inside diameter of said open discharge bottom end, said top end and said intake top end each being fixedly attached to said first flange, said external cone and said internal cone being separated from each other forming an annular space completely around the outside perimeter of said internal cone, said external cone having an air inlet opening, said air inlet port having a first end and a second end, said first end being fixedly attached onto said air inlet opening, said second end being fixedly attached onto said second flange, said air inlet port, said air inlet opening, and said annular space being in open communication, and said open discharge bottom end being notched forming multiple air inlet passages.

* * * * *